United States Patent
Karkos, Jr. et al.

[11] Patent Number: 6,095,677
[45] Date of Patent: Aug. 1, 2000

[54] MAGNETIC DRIVE BLENDER

[75] Inventors: John F. Karkos, Jr., Lisbon Falls, Me.;
John Micheli, Brick, N.J.

[73] Assignee: Island Oasis Frozen Cocktail Co., Inc., Walpole, Mass.

[21] Appl. No.: 09/228,377

[22] Filed: Jan. 12, 1999

[51] Int. Cl.[7] .................................................. B01F 13/08
[52] U.S. Cl. .......................................... 366/274; 366/314
[58] Field of Search .................................... 366/197, 205, 366/273, 274, 314; 416/3; 417/420; 464/29; 99/348; 241/282.1, 282.2

[56] References Cited

U.S. PATENT DOCUMENTS

| | | |
|---|---|---|
| 1,242,493 | 10/1917 | Stringham . |
| 1,420,773 | 6/1922 | Stainbrook . |
| 2,350,534 | 6/1944 | Rosinger . |
| 2,459,224 | 1/1949 | Hendricks . |
| 2,466,468 | 4/1949 | Neal . |
| 2,655,011 | 10/1953 | Ihle et al. . |
| 2,828,950 | 4/1958 | Stilwell . |
| 2,951,689 | 9/1960 | Asp et al. . |
| 3,140,079 | 7/1964 | Baermann . |
| 3,554,497 | 1/1971 | Zipperer . |
| 4,199,265 | 4/1980 | Sanderson et al. ...................... 366/274 |
| 4,568,195 | 2/1986 | Herz et al. ............................... 366/274 |
| 4,752,138 | 6/1988 | Rufer ....................................... 366/273 |
| 4,836,826 | 6/1989 | Carter . |
| 4,913,555 | 4/1990 | Maeda et al. . |
| 4,991,973 | 2/1991 | Maaz et al. .............................. 366/274 |
| 4,993,840 | 2/1991 | Maeda et al. . |
| 5,470,152 | 11/1995 | Rains . |
| 5,478,149 | 12/1995 | Quigg ..................................... 366/273 |
| 5,529,391 | 6/1996 | Kindman et al. ....................... 366/274 |
| 5,656,880 | 8/1997 | Clark . |

*Primary Examiner*—Charles E. Cooley
*Attorney, Agent, or Firm*—Lahive & Cockfield, LLP

[57] ABSTRACT

A magnetic induction drive for a rotatable driven member in a sealed housing, in particular, a shaft-mounted blade in a blender cup, uses a comparatively thin circular plate of a magnetizable material with circumferentially arrayed poles secured within the housing to the shaft. A brushless d.c. motor in a base separate from the housing has a rotor formed as an array of pie-shaped permanent magnet regions that interact with an electronically controlled, rotating electromagnetic field produced by a ring of stator coils. A second such permanent magnet is coupled to rotate coaxially and in unison with the rotor, with poles of opposite polarity aligned and adjacent one another. A steel disc is sandwiched between and bonded to the rotor and the second permanent magnet. The magnetic field (lines of flux) of the second magnet extends axially away from the rotor to induce magnetic poles of opposite polarity in the drive plate. This second magnet-to-plate magnetic coupling operates across a closely-spaced gap that includes the bottom wall of the blender cup base, the upper wall of the housing, and air gaps between these walls, and the plate and the second magnet.

23 Claims, 6 Drawing Sheets

MAGNETIC DRIVE BLENDER

BACKGROUND OF THE INVENTION

This invention relates to a magnetic drive to transmit rotational motion from a motive source into an enclosed space without a direct mechanical connection. More specifically, it relates to blenders, mixers, and like machines, and particularly to devices having a stirrer, impeller, blade, or other tool mounted within a removable cup or container, and rotated by means of a motor located in the stationary base of the machine.

Conventional home blenders and mixers incorporate a mechanically-driven impeller rotatably mounted within a removable blender cup. The base of the cup incorporates a generally circular connection plate with a pattern of projections and/or depressions formed on its lower face that is removably mateable, using a vertical, drop-in movement, with a corresponding pattern formed on a like plate attached to the shaft of a motor housed in a base of the machine. This mechanical coupling between the blender cup and the blender motor requires a rotary seal at the base of the cup between the impeller and connecting plate. This seal is subject to considerable wear and tear over time, as is the mechanical coupling. Because seal failure can result in liquid leaking out of the cup, the seal and bearings in the base of the cup are built to ensure sealing at the expense of friction. The friction produces wear, heat, and loss of power. Moreover, the conventional blender produces much unwanted noise, and the mechanical interlocking coupling between the plates can make it awkward or difficult to remove the cup from, and return the cup to, the base.

Many drink mixers have the drive motor mounted in the base directly under the cup. If overall height is a concern, however, the motor may be positioned off to the side and coupled to the driving shaft by a belt or gear arrangement.

Known home and commercial blenders use conventional a.c. motors. While a.c. motors can be constructed and controlled to provide speed variation, as well as the requisite output torque, a typical such motor is generally bulky, heavy, and not well-suited to electronic speed control, let alone electronic braking.

While d.c. brushless motors are also known per se, they have not been used for blenders or blender/shavers. These motors use a comparatively heavy rotor formed of a sector-like array of permanent magnets. Blending of a mass of shaved or cubed ice and liquid, particularly on start up or during a "freeze up" of a frozen drink, requires a comparatively high torque. D.C. brushless motors are characterized by a low output torque as compared to conventional a.c. motors. They therefore have found use as a motive power source mainly in applications such as fans where a low output torque is acceptable.

A commercially viable blender/shaver for the production of frozen drinks must satisfy a variety of special and important design criteria. It should be compact, both in its footprint and overall height, so as to utilize limited space at a bar efficiently. It ideally has a comparatively low weight. The straight-forward approach of placing a conventional electric motor directly under the blender cup increases the overall height of the machine, and therefore is not typically used. There must also be speed control, typically provided through gearing and electronics, to accommodate different power and speed requirements in different phases of operation. Rapid controlled braking is also important to limit the overall time required to blend, to avoid splashing of the blended material after blending is complete, and for safety. Control of vibration, prevention of overheating, minimization of wear, ease of maintenance, and durability are also important.

It has also known that an impeller within a blender cup may be driven magnetically or electromagnetically rather than mechanically. One type of magnetic drive couples a rotating permanent magnet outside a blender cup or the like, to another permanent magnet rotatably mounted in the blender cup. U.S. Pat. Nos. 2,459,224 to Hendricks; 2,655,011 to Ihle et al.; and 5,478,149 to Quigg are exemplary of this approach. Hendricks discloses a magnetically operated stirrer for mixing liquids, in which the stirrer has a magnet mounted at its lower end and within the container for the liquid. Quigg discloses a motor that drives a set of magnets, via gear box and shaft, to couple to another set of magnets mounted on an agitator.

U.S. Pat. No. 3,140,099 to Baermann uses a large rotating plate to carry a series of circumferentially spaced magnets that pass under one portion of a much smaller, rotatable conductive disc.

U.S. Pat. Nos. 1,242,493 to Stringham and 1,420,773 to Stainbrook disclose electrical drink mixers in which a stator of an a.c. motor surrounds and interacts with a rotor in a blender cup, or in its base. In Stringham, a squirrel cage rotor lies in the plane of the stator windings. In Stainbrook an a.c. rotor is mounted in the base of the blender cup and stator coils are located below the cup. Such split a.c. motor arrangements are limited by the torque, speed control, eddy current loss, and emf interference problems of a.c. motors, as accentuated by the physical separation of the stator windings and the rotor. They do not provide good speed control. They do not utilize a d.c. magnetic field coupling. And the inclusion of the rotor of the motor within the container or cup adds unwanted weight to the cup assembly and makes the cup difficult to handle due to gyroscopic effects if it is picked up while the rotor is still spinning.

If the rotor of a brushless d.c. motor were to be located in the base of a blender cup, the cup would not only become heavy and exhibit a severe gyroscopic effect, but it would also "stick" to metal sinks and countertops, and would attract loose metallic implements such as silverware, barware, or coins.

It is therefore a principal object of this invention to provide a drive system that provides reliable, speed-controlled rotary power transmission to a rotatable driven element that is sealed from the source of motive power.

Another aspect is to provide a drive that is automatically clutched to disconnect the drive when the load exceeds a preset value or the driven member is moved from its operating position.

A further object is to provide a magnetic drive offering these advantages, in which the driver element is located in a removable blender cup and the blender cup is easy to insert and remove from the blender and is easy to handle when removed from the blender, e.g., it exhibits no significant gyroscopic effect or magnetic attraction.

Yet another object is to provide a low wear, low maintenance, non-mechanical coupling between motor and drive element, and in particular, one which avoids the high maintenance costs associated with present belt drives and mechanical clutches and brakes.

A still further object is to provide a magnetic drive for a blender or the like with the foregoing advantages which is compact, low in weight, and very easy to use and clean.

Another object is to provide a drive whose operating characteristics can be programmed and which can be braked rapidly and reliably.

SUMMARY OF THE INVENTION

In its preferred application as a drive for a blender or other food processing apparatus, the present invention employs an electric motor to rotate a ring magnet, preferably an assembly of two ring magnets with axial poles, that is closely spaced from a disc-shaped drive plate formed of a conductive, magnetizable material. The magnet assembly and drive plate each have matching, circumferentially-arrayed poles. The magnet assembly preferably has a set of an even number of generally pie-shaped, permanent magnet poles or segments of alternating polarity. The drive plate is preferably a thin sheet of a ferrous material such as cold-rolled steel with open-ended radial slots that define the poles and control eddy currents. The magnet assembly produces a sufficiently strong field (flux lines) that despite the spacing, which typically includes high reluctance air gaps, nevertheless induces oppositely polarizing magnetization of the disc poles. This induced magnetization couples the magnet assembly to the plate in order to drive it. In a blender, the drive plate is rotatably mounted in the base of the blender cup and supports a shaft that in turn mounts an impeller. The magnet assembly and the motor are separately housed.

The electric motor is preferably a brushless d.c. motor with stator windings that produce a rotating electromagnetic field that interacts with, and produce a torque on, a rotor that includes a magnet assembly like the one magnetically coupled to the disc. The rotor magnet ring is preferably secured to the drive magnet ring by bonding these magnet rings to opposite faces of a circular cold-rolled steel disc. The rotor, drive magnet ring and drive plate are co-axially aligned when the plate and its associated apparatus such, as a blending cup, are in an operating position. The motor and drive housing preferably has a flat upper wall that extends continuously through the magnet-to-plate gap, as does a flat bottom wall on the blender cup. For a magnet assembly with a field strength on its surface of 1400 gauss, the close spacing for a blender application is preferably about 0.25 inch. Use of a comparatively flat d.c. brushless motor mounted under the driven member gives the motor part of the drive a compact configuration, preferably with a height-to-width ratio of as little as about 1:3.

Viewed broadly as a method, the invention includes the steps of rotating a rotor magnet with multiple circumferentially-spaced, poles by interacting the poles with a rotating electromagnetic field. The rotor is in turn coupled to a second drive magnet with a like number of circumferential poles mechanically coupled to rotate in unison with the rotor. The method further includes the steps of directing the magnetic field of the drive magnet axially away from the rotor to induce oppositely polarized magnetic poles in a conductive drive plate that is rotatably mounted, and closely-spacing the drive magnet from the plate so that the induced poles in the plate follow the poles in the rotating magnet assembly despite the spacing and despite a load that resists rotation. The directing of the magnetic field includes bonding the magnets in a sandwich fashion to opposite faces of a thin steel disc and polarizing the ring magnets axially.

These and other features and objects of the invention will be more fully understood from the following detailed description that should be read in light of the accompanying drawings.

DETAILED DESCRIPTION OF THE PREFERRED EMBODIMENTS

Figure 1:
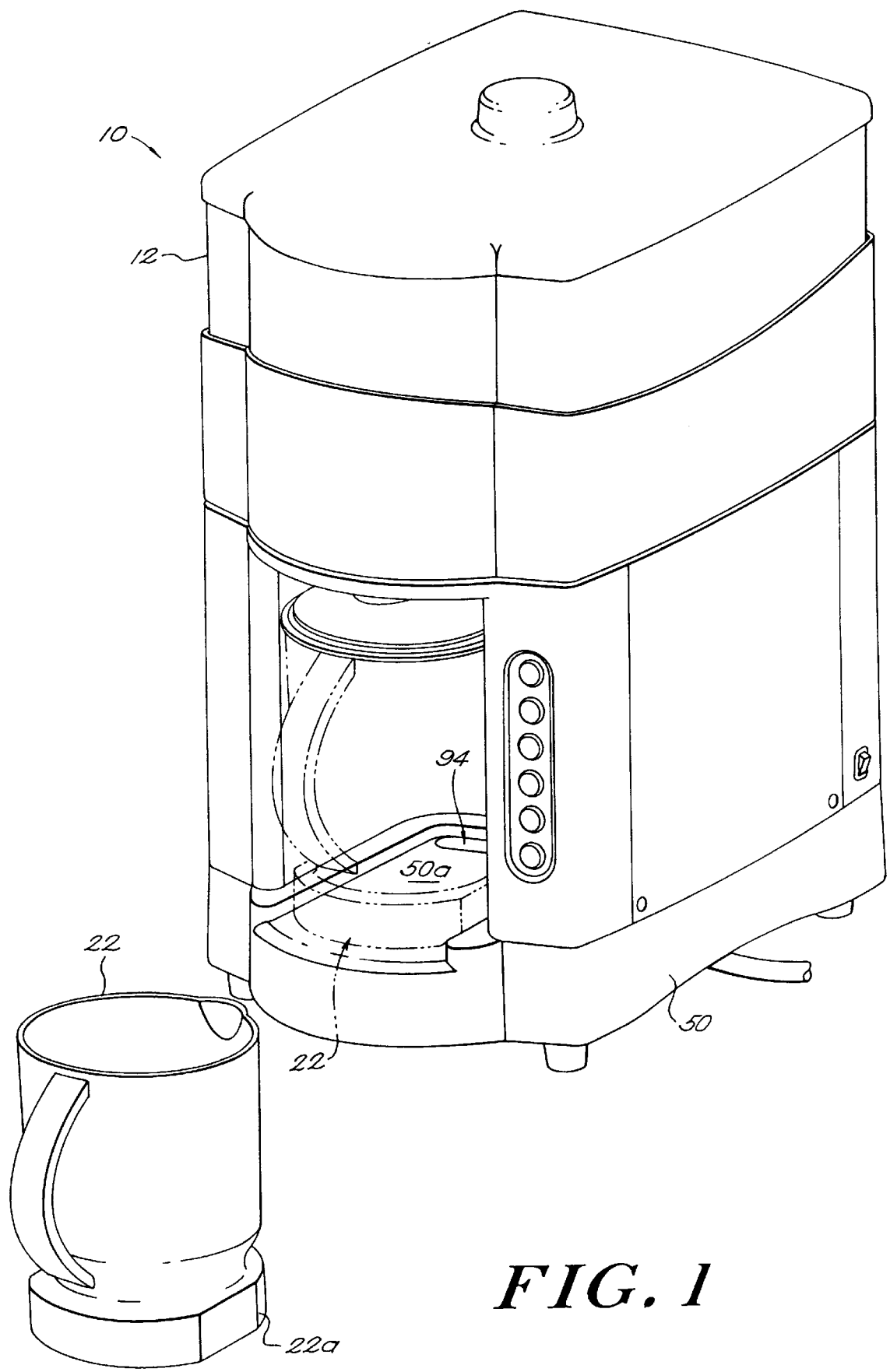
FIG. 1 is a view in perspective of a blender/shaver machine constructed according to the present invention.
Figure 2:
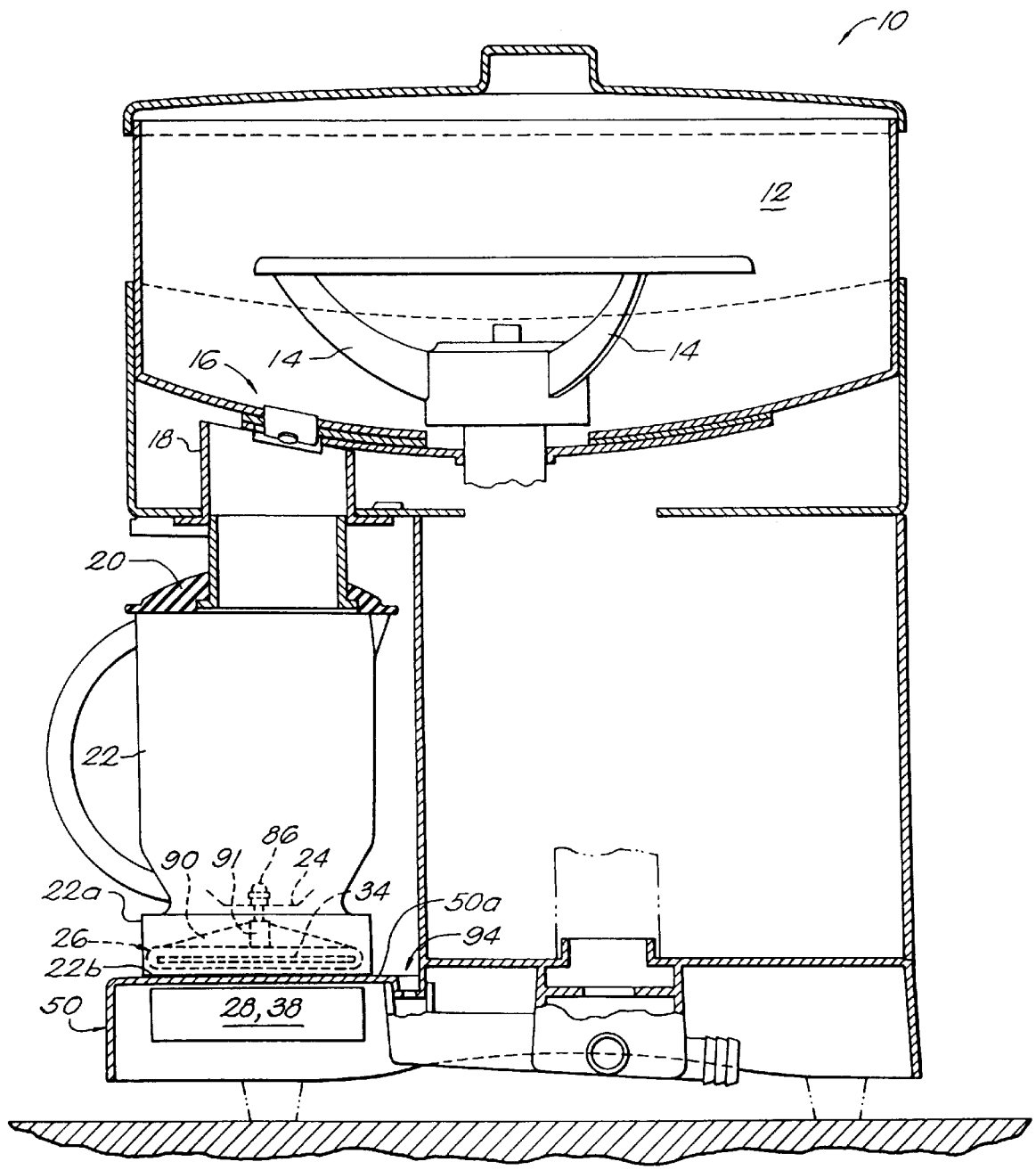
FIG. 2 is a view in vertical section along the lines 2—2 in FIG. 1.

FIGS. 1 and 2 show a principal application of the present invention, namely, in a blender/shaver machine 10 adapted to the automatic manufacture of frozen drinks in bars and restaurants. A supply of ice held in a hopper 12 is fed by a rotating set of blades 14 to a blade ice/shaver 16. The shaved ice falls through a chute 18 including a lid 20 into a blender cup 22 to which liquid ingredients such as a flavor concentrate and/or spirit have been added. Rotation of an impeller (or blade set) 24 at the bottom of the cup for a preset period of time produces a high quality frozen drink—one that peaks when poured and has a generally uniform, non-marbled, non-watery consistency. While the invention will be described below principally with reference to use in the blender/shaver 20, it will be understood that the invention can be used in a wide variety of applications where it is desired to transmit power from a rotary output of a motive source (e.g., a motor) to a driven member under a load, particularly a rotating driven member held in a container that is sealed from and removable from the motive source. The invention can be used, for example, in a variety of food processing equipment such as home blenders, food mixers, food processors and juicers.

Figure 3:
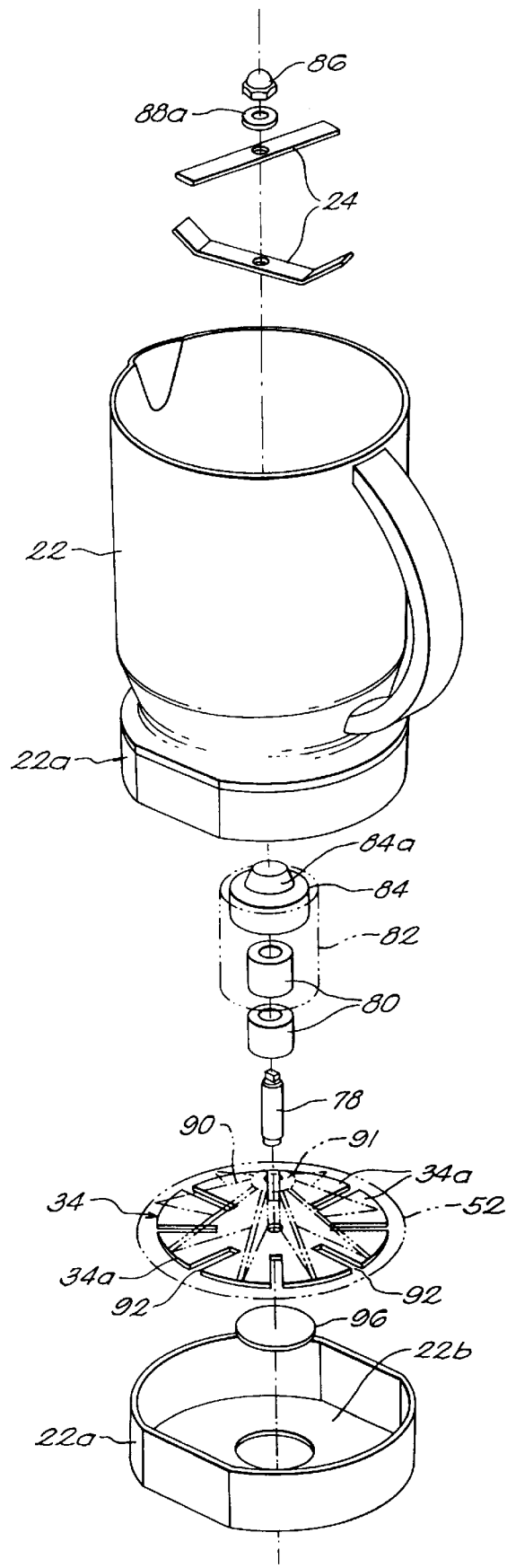
FIG. 3 is an exploded perspective view of the blender cup shown in FIGS. 1 and 2.
Figure 4:
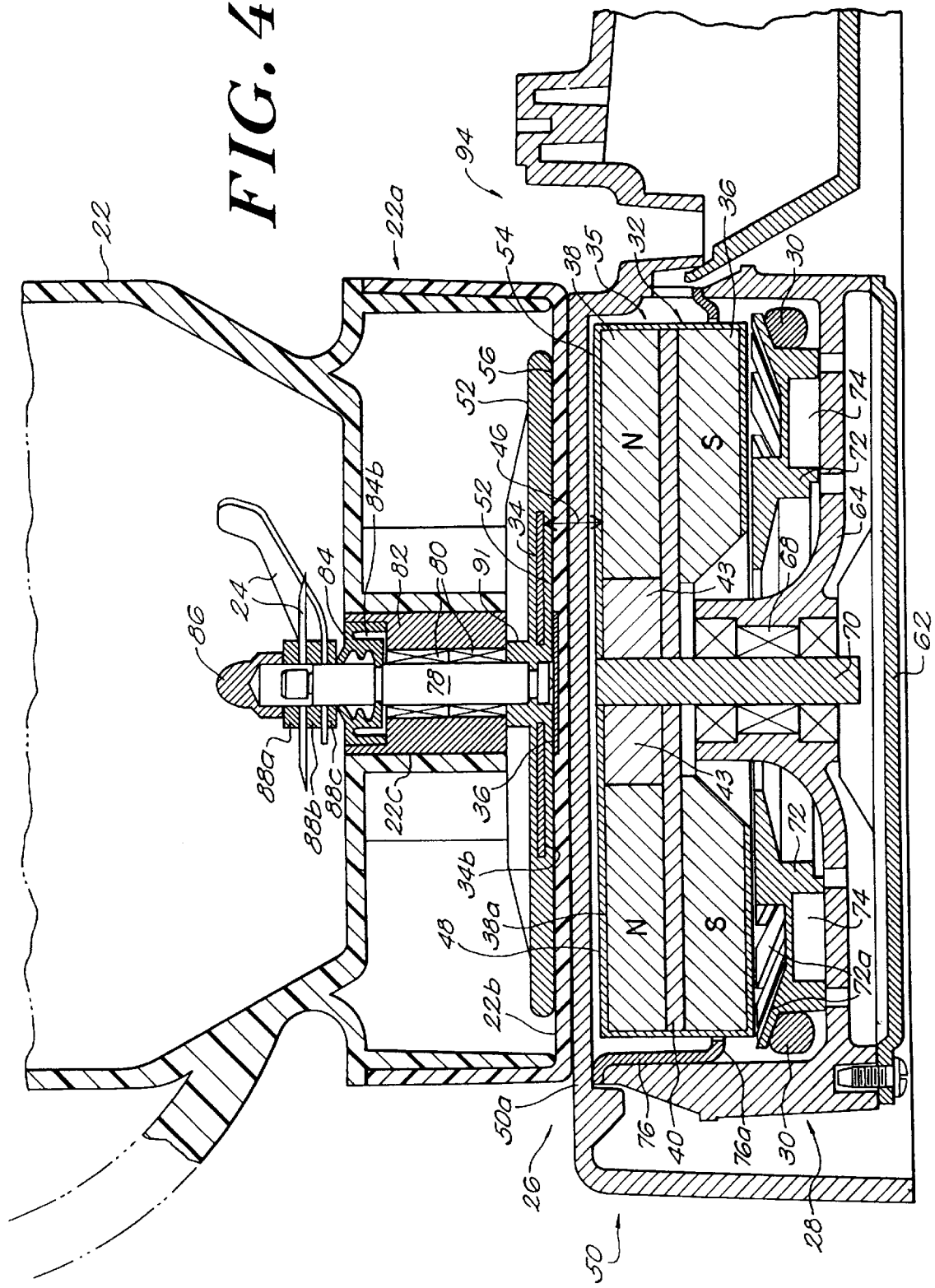
FIG. 4 is a detailed view in vertical section of the magnetic drive of the present invention as shown in FIG. 2 used to power an impeller mounted in the base of a blender cup.
Figure 5:
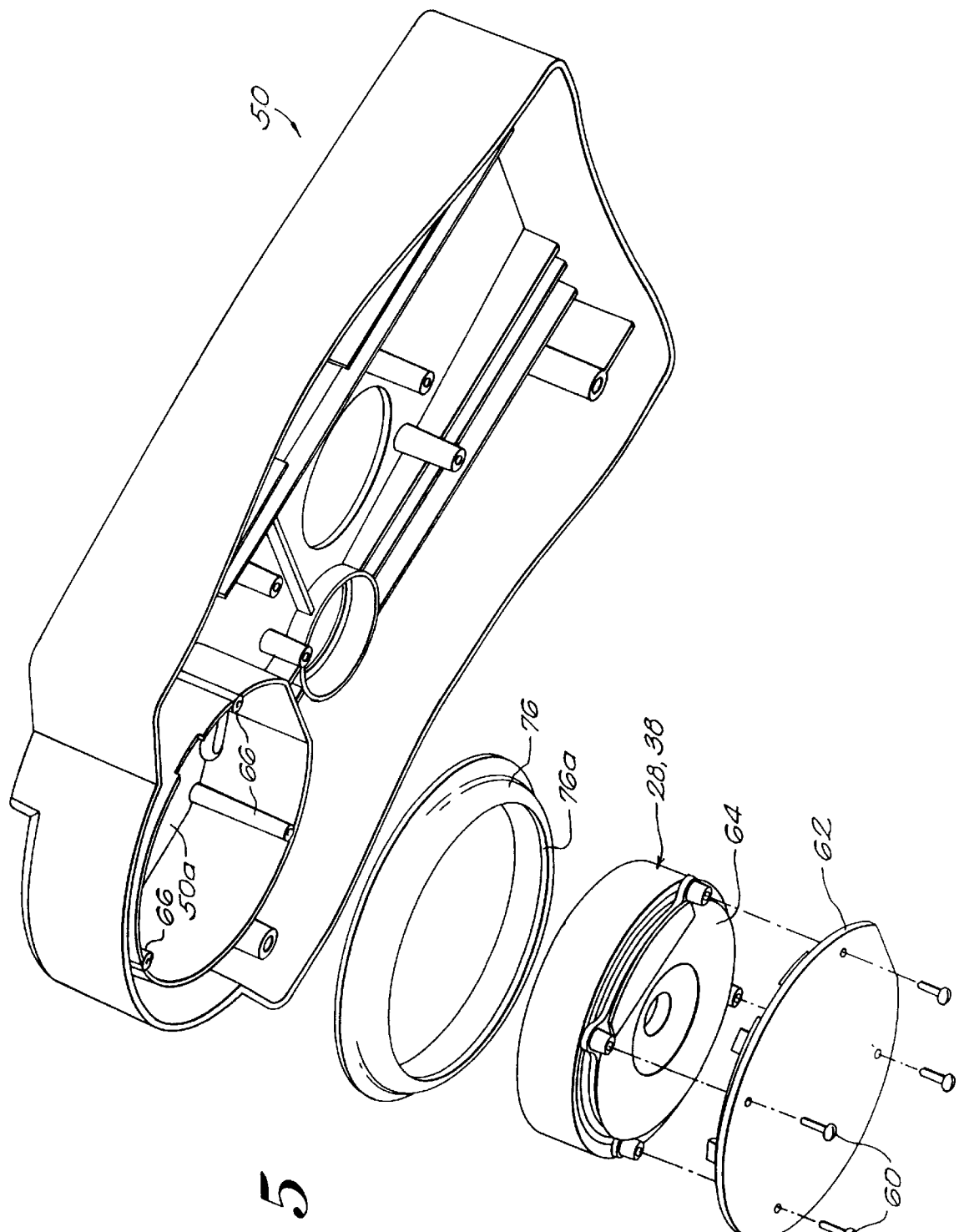
FIG. 5 is an exploded perspective view of the base of the blender/shaver shown in FIGS. 1 and 2 showing the mounting of the motor assembly for the magnetic drive according to the present invention.

A magnetic drive 26 for the impeller 24 is the focus of the present invention. With reference to FIGS. 3–5, the drive 26 includes a generally circular drive plate 34 rotatably mounted in the base 22a of the blender cup 22, and a brushless d.c. motor 28 including stator coils 30 and a rotor 32. The rotor in turn includes a double magnet assembly 35 preferably formed of a rotor ring magnet 36, a drive ring magnet 38 and a disc 40 of a magnetizable material, preferably cold-rolled steel, bonded between the magnets 36 and 38.

Figure 6:
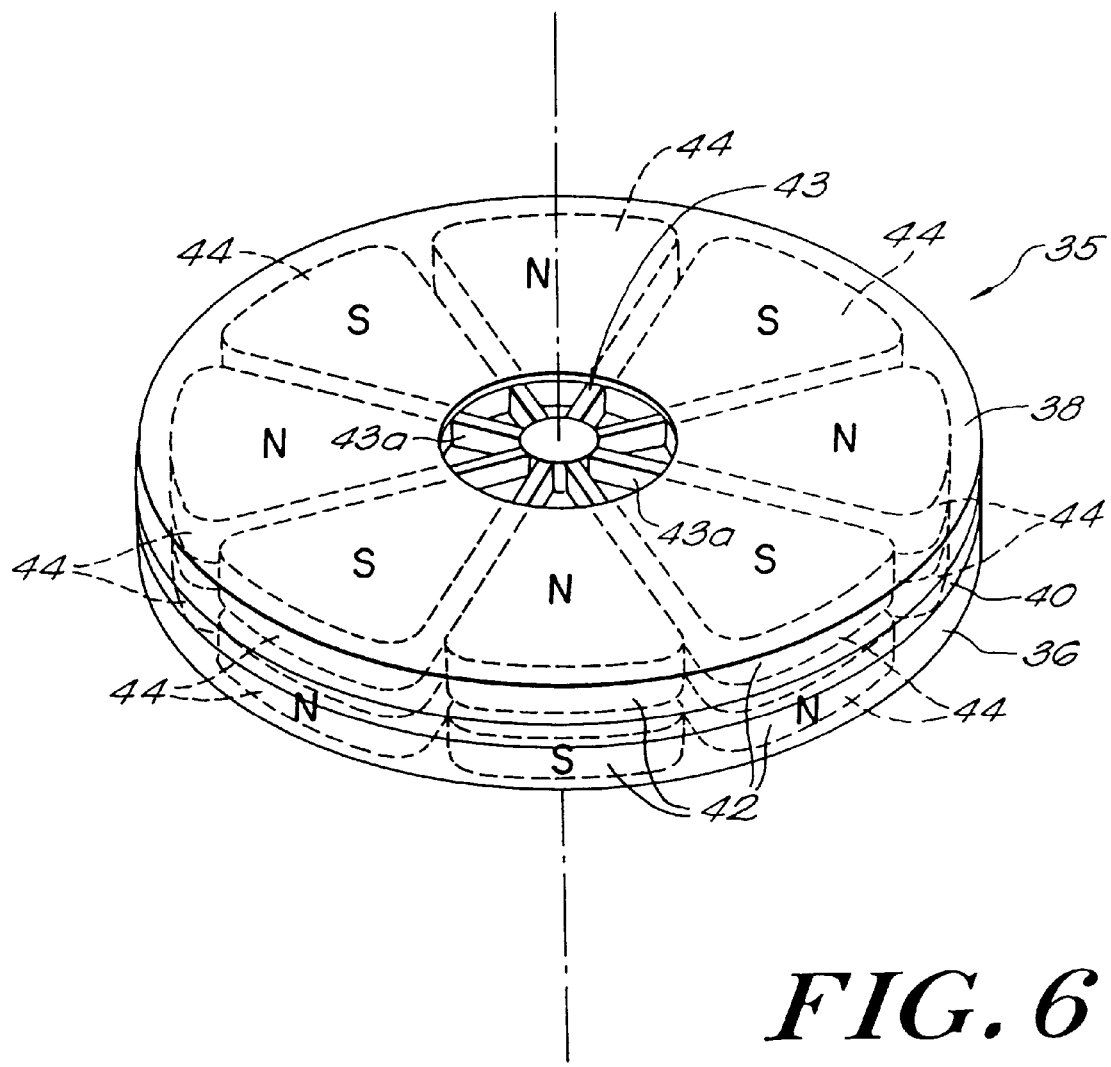
FIG. 6 is a view in perspective of the double magnet assembly shown in FIG. 4.

The ring magnets 36 and 38 each have multiple circumferentially-arrayed, axially-directed poles 42, eight as shown in FIG. 6. Laterally adjacent segments have the opposite polarity. While eight poles are preferred, any even number can be used. Preferably each pole 42 is developed by a generally pie-shaped permanent magnet region 44 formed in a continuous ring of a strongly magnetic material such as the ceramic magnets sold by Hitachi Corporation. The magnet regions 44 in each magnet 36 and 38 can also be separate pieces bonded or otherwise mechanically secured to one another to form a ring assembly with flat faces and a generally cylindrical outer wall. A plastic hub 43 with radially-directed support walls 43a fills the center of the magnets 36, 38 to facilitate mounting the assemblies on a central shaft. A north pole magnet region 44 is adjacent a south pole magnet region 44. Assemblies 36 and 38 are then affixed to the disc 40, preferably with each permanent magnet region 44 in one assembly overlying a like magnet region in the other assembly, but having the opposite polarity to avoid the repulsive magnetic force between the magnets 36 and 38. A plastic overlayer 48 helps to secure the sandwich assembly. This magnet assembly configuration with axially oriented magnetic pole regions 44, and the low reluctance return path presented by the steel disc 40 for all of the magnet regions 44, directs the magnetic field (lines of flux) of the rotor magnet 36 axially (downwardly as shown) toward the stator coils 30 and the magnetic field of the drive magnet 38 axially (upwardly as shown) toward the plate 34 in the cup base 22a. The strength and this axial directing of the field of the drive magnet 38 induce magnetic fields of opposite polarity in a corresponding poles 34a formed in the drive plate 34 despite the presence of a spacing 46, albeit a close spacing, between the generally flat upper surface 38a of the magnet assembly and the generally flat lower surface 34b of the plate 34.

In the preferred form illustrated and shown for the blender/shaver 10 (used to blend up to 80 fluid ounces of a frozen drink), the permanent magnet 36 develops a magnet field strength of about 1400 gauss at its surface, and the spacing 46 is about 0.25 inch measured axially. This spacing includes, as shown in FIG. 4, not only four layers 48, 50a, 52, 22b of what is typically a plastic material, but also air gaps 54 and 56. Layers 48 and 52 are a thin plastic over-molding for the magnet assembly 35 and the drive plate 34, respectively. The layer 50a is the flat upper wall portion of a base 50 of the blender/shaver 10. Layer 22b is the flat lower wall of the cup base 22a.

The air gap 54 is a slight clearance between the rotor over-molding 48 and the wall 50a. The gap 56 is a slight clearance between the wall 22b and the drive plate over-molding 52. As will be readily appreciated by those skilled in the art, this spacing is a significant source of reluctance in the magnet circuit between the ring drive magnet 38 and the plate 34. Permanent magnet rotors of known d.c. brushless motors, e.g., the 5 inch disc-diameter motor sold by Integrated Motion Controls, LLC of Torrington, Conn. under its Model No. 50, while roughly comparable in size, construction and field strength to the magnet 38, cannot couple to the plate 34 across the spacing 46 with sufficient strength to drive the disc operating a blender/shaver.

With particular reference to FIGS. 4 and 5, the motor 28 is mounted in the base 50 by screws 60 that pass through a steel motor cover 62 and a rear stator support 64 into threaded sockets 66 formed in a motor mount wall 50b of the base. The rear stator support 64 has a central opening that holds a bearing assembly 68 that journals a motor shaft 70. Screws (not shown) passing through openings 54a in the rear stator support thread into and secure a front stator support 72 to sandwich a ring 74 of back steel in the assembly adjacent the coils 30. The front stator support 72 has a periphery 72a that is sloped and slotted to carry the stator windings 30 as in the aforementioned Model 50 motor. (The portions of the windings in the slots are not shown for clarity.) The windings are three phase, being energized by a conventional brushless d.c. motor drive circuit to produce a rotating electromagnetic field. The base and stator supports are preferably formed of a moldable, high-strength plastic, and with a wall thickness, that rigidly supports the motor 28.

The double magnet assembly 35 with the shaft 70 secured at its center slides axially into the bearing 68 (FIG. 4). The assembly 35 rotates in the bearing 68 with a clearance on all sides of the assembly 35. As noted above, the multi-pole, d.c. magnetic field produced principally by the lower (as shown) rotor magnet 36 is directed principally downwardly to interact with the rotating electromagnetic field produced by the stator coils 30 when they are energized. Rotation of this electromagnetic field interacting with the rotor magnet assembly produces a torque that rotates the rotor at a like rotational speed. The disc 40 bonded between the magnets 36 and 38 transmits this torque to the plate drive magnet 38. As a safety precaution against combustion should the coils 30 overheat, a ring-like shroud 76 has a lower flange 76a that extends substantially across the air gap between the outer edge of the assembly 35 and the generally cylindrical inner side wall of the rear stator support 64 (with a slight clearance to avoid frictional contact with the magnet assembly 35). The shroud fills this gap sufficiently to impede an air flow that would otherwise feed oxygen to a fire.

The magnet assembly 35 in a five-inch diameter weighs approximately three pounds. With typical operating speeds varying from 4,000 to 10,000 rpm, it can exert significant forces on the mounting structures, particularly rapidly varying forces that produce vibrations. The mounting structure is made sufficiently rigid, through choice and dimensions of materials as well as the overall design, e.g., the use of wall reinforcements such as exterior ribs, to resist the forces and moments produced in normal operation, and thereby to control vibrations that would otherwise loosen, wear and the extreme, eventually destroy the motor.

Position of the rotor is sensed by three conventional Hall effect sensors mounted in a known manner in the motor housing, or the base 58. Position signals provide input to a known electronic control and drive circuit that energizes the three phase stator windings 30 to produce (i) a start-up torque, (ii) a ramp up of the rotor speed of rotation to a selected operating speed, (iii) a maintained rotation at that selected speed under load, and then (iv) a rapid and reliable braking. Operating of the motor is thus electronically controlled and programmable. Braking is electronic—with the braking currents induced in the windings 30 being dissipated in large resistors or FET's mounted on heat sinks.

With reference to FIGS. 2–4, and especially FIGS. 3 and 4, the conductive drive plate 34 is non-rotatably secured to the lower end of a shaft 78 that is journalled in a stacked pair of needle bearing assemblies 80. A surrounding brass collar 82 press fit into a central, cylindrical-walled opening 22c in the plastic base 22a holds the bearing assemblies 80. At the bottom of the cup, the collar 82 has an enlarged diameter counter bore that receives and secures a rotary seal 84 formed of a suitably elastomeric material such as a wear-resistant rubber. The seal has three inwardly-facing, mutually-spaced lips 84a whose inner edges each engage, and provide a low-friction running or sliding seal around the shaft 78. The seal 84 retains liquid in the cup 22 despite the presence of a rotating shaft penetrating the bottom wall of the cup. The lower-most lip 84a engages the shaft 78 in a circumferential groove that locates and stabilizes the seal. A deep circular groove 84b in the lower face of the seal allows the lips to flex resiliently, yet lightly, against the shaft. Above the seal, an acorn nut 86 threaded on the upper end of the shaft 78 secures the blades 24 sandwiched between three washers 88a, 88b, and 88c.

The drive plate 34 is part of a drive plate assembly that includes a set of vertical, radially-arrayed, reinforcing ribs 90 angularly centered over each pole 34a (FIG. 3). The ribs 90 and a central boss 91 that surrounds the shaft 78 are preferably molded continuously with the bottom layer 52. The plate 34 is preferably formed of a thin sheet of a ferrous material such as cold-rolled steel, e.g., 0.058 inch thick, with a set of open-ended radial slots 92 that produce the poles 34a. The slots 92 also control eddy currents induced in the plate by the rotating field of the drive magnet assembly 38. Because the plate 34 is thin and slotted, it can deform when it is subjected to the significant attractive magnetic force of the plate drive magnet assembly 38, e.g., typically about five pounds, and be placed in frictional contact with the cup base 22b. The ribs 90 and the over molding generally help the plate to retain its flat configuration.

As shown, the attractive magnetic force acting on the drive plate 34 is preferably carried at a single, central pivot point formed by a hemispherical ball-bearing projecting from the bottom surface of the drive assembly and a stainless steel plate 96 mounted flush with the upper surface of the cup base wall 22b. This arrangement resists the magnet forces pulling down on the plate 34 while at the same time facilitating a low-friction, low-wear rotation of the shaft 78.

It has been found that the coupling, or "traction", between the magnet 38 and the drive plate 34 increases not only as a function of the strength of the magnetic field acting on the poles 34a and the closeness of the magnet-to-disc spacing, but also as a function of the thinness of the plate 34 and the width of the slots 92. In general, the thinner the plate and the wider the slots, the more traction is produced for a given magnet and spacing. The presently preferred slot width for an eight-pole, 4.425 inches diameter plate is about 0.245 inch.

The desired level of traction depends on each application. It is selected to reliably couple the drive plate to the drive magnet when (i) the impellers 24 are started under the load of the shaved ice and liquid ingredients of a frozen drink in the blender cup, (ii) during a ramp up of the operating speed to a selected operating speed, typically thousands of rpm, and then (iii) as the impeller, and the slushy mass in the cup and interacting with the impeller, is brought to a stop. However, the traction is also selected to disconnect, and thereby automatically clutch, the drive 26 when the cup 22 is removed from its operating position on the base wall 50a under the ice chute 18, or when the load exceeds a preset maximum value. This latter situation can arise, for example, when the frozen drink "freezes up" in the cup, that is, becomes partially or totally a solid frozen mass, or when an object inadvertently falls into the blender as it is operating, e.g., a spoon, jewelry, or bottle cap. By de-coupling, the magnetic drive 26 automatically and immediately cuts off power to the impellers to avoid or minimize injury to person(s) near the blender and to the machine itself. This feature also avoids the cost of providing and maintaining a mechanical clutch.

While brushless d.c. motors are known as having comparatively low torque outputs, the present invention has been found to overcome this deficiency. However, to optimize the performance of the motor 28, the stator coils 30 are preferably wound to optimize the torque output at a preselected operating speed, e.g., near 8,000 rpm.

It is significant to note that the drive plate assembly, mainly a thin metal disc and plastic molding over it, are light and non-magnetic. There is little detectable gyroscopic effect when the cup is removed from the blender/shaver after use. There is a low rotational momentum due to the impellers and drive plate assembly. Because the cup is lightweight and non-magnetic, it is easy to handle.

It is also quite significant that the magnetic drive 26 of the present invention allows the cup 22 to be placed in an operating position on the blender/shaver 10 with a simple, lateral sliding movement over the smooth, flat cup base 22b over the smooth, flat base portion 50a. There is no need to drop the cup vertically onto a mechanically interlocking drive coupling, and then vertically lift the cup off this coupling. The lateral sliding insertion and removal movements are not only more convenient, but they also reduces the vertical clearance required above the cup. This slide-in arrangement also facilitates cleaning the blender base—one need only wipe a smooth surface. Spilled liquid and slush can flow or be pushed over the surface to a drain 94 formed in the base at the rear of the wall 50a. In the event of a safety hazard, blender overload, or any unusual situation requiring a rapid removal of the cup, it is simply and rapidly withdrawn from the machine with a sliding motion. Further, and quite importantly, if an operator is impatient and removes the cup before the motor has fully stopped, a common problem in actual use in a bar, the process of removal itself automatically disconnects the impeller drive from the motor 28 (a misalignment and/or lifting of the cup moves the poles 34a out of a coupled relationship with the magnetic lines of force produced by the magnet assembly 38.) In conventional belt driven, mechanically-clutched blender/shavers, such a premature removal causes stress and wear on the drive train and the clutch.

A further significant advantage of this drive is that it places the motor directly under the blender, thus eliminating drive belts or chains and pulleys or sprockets, but does so while still maintaining vertical, as well as horizontal compactness, both in terms of the height of the motor itself, the vertical height of the coupling between the motor and the cup, and the vertical clearance needed to maneuver the cup onto and off the coupling.

While this invention has been described with respect to its preferred embodiment, it will be understood that various modifications and variations will occur to those skilled in the art. For example, while this invention has been described as powered by a d.c. brushless motor, it is possible to achieve some of the advantages of this invention by using an a.c. motor whose output shaft is coupled to the plate drive magnet. While a rotating magnet assembly has been described as the member coupling to the plate in the cup base, it is possible to produce a rotating electromagnetic or magnetic field using an assembly of electromagnets or other permanent magnet arrangements such as a single, one-piece permanent magnet magnetically configured, or acting in combination with ferromagnetic materials, to produce the desired array of magnetic poles. While the invention has been described with reference to a plate rotatable in the base of a blender cup, the driven element could assume a wide variety of other forms, and need not even be a liquid-holding vessel. While the magnets and plate have been described as having the same number of poles, as is well known, this is not essential to the operating of this invention. A variety of mounting and rotational support arrangements are possible for both the double magnet assembly 35 and the driven conductive plate 34. Further, while a radially slotted plate 34 has been described as forming the poles 34a and controlling eddy currents in the plate, one skilled in the art will readily see that a variety of other known arrangements for forming poles and controlling eddy currents are possible. Still further, while the magnets have been described as bonded to a metal disc, it is not necessary to use this disc.

These and other modifications and variations which will occur to those skilled in the art having read the foregoing specification in light of the accompanying drawings are intended to fall within the scope of the appended claims.

What is claimed is:

1. A compact, automatically clutched, rotary drive for a driven member mounted in a first housing, comprising an electric motor located outside of said first housing having a stator and a rotor, said rotor includes a first magnet with a plurality of circumferentially-arrayed poles, said stator producing a rotating electromagnetic field that interacts with said poles to produce a rotary output, a second magnet axially aligned with and physically coupled to rotate with, said rotor, said second magnet having a like plurality of circumferentially-arrayed poles that are also aligned by pole polarity with said poles of said first magnet, the lines of magnetic flux of said second magnet extending axially and principally in a direction away from said stator, a plate of a magnetizable material operatively connected to said driven member and rotatably mounted in said first housing in a closely spaced, axially-aligned relationship with said second magnet, whereby said second magnet induces a magnetic field in said plate to transmit torque to said plate from said electric motor.

2. The rotary drive of claim 1 wherein said electric motor is a brushless d.c. motor, said rotor is disc-shaped, and said poles are formed by plural, axially-oriented, permanent magnet regions arrayed equiangularly about said rotor.

3. The rotary drive of claim 1 further comprising a second plate of a magnetizable material secured between said first and second magnets.

4. The rotary drive of claim 3 wherein said first and second magnets are centered on a common axis of rotation of said electric motor and said second plate.

5. The rotary drive of claims 1 or 4 wherein said plate is thin, generally circular, and has a plurality of poles corresponding to the number of said poles of said second magnet.

6. The rotary drive of claim 5 wherein said plate is formed of cold-rolled steel.

7. The rotary drive of claim 6 wherein said first and second magnets and said plate each have eight poles.

8. The rotary drive of claim 1 further comprising a second housing that encloses said electric motor and said second magnet, and wherein said close spacing accommodates (i) an upper wall of said second housing, (ii) a lower wall of said first housing, (iii) an air gap between said lower wall and said plate, and (iv) an air gap between said upper wall and said second magnet.

9. The rotary drive of claim 8 wherein said second magnet has a field strength of about 1400 gauss at its surface and said close spacing, measured axially, is about 0.25 inch.

10. The rotary drive of claim 8 wherein said plate and at least said second magnet are each over-molded with a layer of a plastic material, and said close spacing includes both of said plastic material layers.

11. The rotary drive of claim 1 wherein said electric motor and second magnet have a maximum height-to-width ratio of about 1:3, where height is measured along the axis of rotation of said electric motor and said second magnet.

12. The rotary drive of claim 1 wherein said plate is sheet steel with a plurality of radially directed open slots that define said poles.

13. The rotary drive of claim 1 wherein said electric motor includes an output shaft secured to said rotor and rotatable within said stator in bearings, a rear stator support that supports said bearings at its center and has rigid, generally cylindrical side walls surrounding said stator and said rotor with a gap, and a shroud that spans said gap.

14. The rotary drive of claim 1 wherein said first housing is the base of a blender cup, and the driven member is a shaft connected to and centered on the axis of rotation of said drive plate and a set of blades secured on said shaft.

15. The rotary drive of claim 14 further comprising a sliding seal secured in said first housing adjacent said blender cup.

16. The rotary drive of claim 1 wherein said first and second magnets are a single ring magnet.

17. A method of driving and clutching, with no direct mechanical coupling, a shaft rotatably mounted in a first housing, comprising the steps of:

rotating a first magnet located outside said first housing with plural poles using a rotating electromagnetic field, coupling a second magnet, with corresponding poles, to said first magnet to rotate in unison therewith about a common axis of rotation, directing the magnetic lines of flux of said second magnet axially away from said first magnet, rotatably mounting a drive plate of a conductive, magnetizable material, also with corresponding poles, in said first housing, and closely spacing said drive plate and said second magnet to form a gap therebetween so that said second magnet, in combination with said directing, induces magnetic poles at said plate poles that couple said second magnet to said plate magnetically across said gap to rotate said plate.

18. The method of claim 17 wherein said rotating is produced by actuating a brushless d.c. motor.

19. The method of claim 18 further comprising the step of bonding said first and second magnets in a face-abutting, axially-aligned relationship to a conductive disc located therebetween.

20. The method of claim 19 further comprising the step of enclosing said first and second magnets in a second housing having an upper wall lying in a portion of said close spacing.

21. The method of claim 17 wherein said clutching comprises selecting the value of said close spacing and the strength of said directed magnetic lines of flux of said second magnet so as to break said magnetic coupling across said gap at the occurrence of at least one of (i) resistance to said rotation of said shaft that exceeds a preselected value, (ii) an increase in said close spacing, and (iii) a disruption of said axial alignment of said drive plate and said second magnet.

22. The method of claim 17 wherein the speed of said rotating is electronically controlled and variable between start-up and operating conditions, and between operating and shut-down conditions.

23. A drive for a blade rotatably mounted on a shaft in the base of a blender cup, comprising:

a housing that includes a generally flat base wall adapted to receive the blender cup thereon in an operating position, a brushless d.c. motor mounted under, and in close physical proximity to, said base wall, said motor having a rotor formed of a circular array of permanent magnet regions that produce a plurality of circumferentially arrayed magnetic poles of alternating polarity, a drive magnet coupled to said rotor along a common axis of rotation and having a like array of permanent magnet regions, the permanent magnet regions of said rotor and said drive magnet being axially-aligned and having the same polarity, a plate of a conductive, magnetizable material rotatably mounted in said blender cup base and operatively connected to the shaft, said plate having formed therein a plurality of circumferentially arrayed poles each adapted to have a magnetic pole induced therein by the magnetic field of one of said poles of said drive magnet, said cup base having a generally flat lower wall that is closely spaced from said plate and in an abutting relationship with said generally flat base wall when said blender cup is in said operating position on said base wall, and said drive magnet being closely spaced from said generally flat base part so that said plate is inductively coupled to said drive magnet to transmit torque.

* * * * *